United States Patent [19]

Hashizume et al.

[11] 3,806,666

[45] Apr. 23, 1974

[54] RECORDED SIGNAL TRANSMISSION SYSTEM

[75] Inventors: Tsuneharu Hashizume; Michihiko Sasaki; Masanori Tatsuno; Toshiaki Demachi; Osamu Hatakoshi; Shigeru Miyauchi; Susumu Amemiya, all of Nagano, Japan

[73] Assignee: Kabushiki Kaisha Sankyo Seisakusho, Nagano, Japan

[22] Filed: Oct. 4, 1971

[21] Appl. No.: 185,959

[30] Foreign Application Priority Data

Oct. 2, 1970 Japan .............................. 45-86482

[52] U.S. Cl. ......................... 360/8, 179/15.55 R

[51] Int. Cl. ........................................... G11b 15/06

[58] Field of Search .......... 179/15.55 R, 15.55 T, 179/100.2 S, 100.2 MD

[56] References Cited

UNITED STATES PATENTS

| | | | |
|---|---|---|---|
| 1,518,656 | 12/1924 | Hanson | 179/15.55 |
| 3,027,425 | 3/1962 | Tannenbaum et al. | 179/100.2 S |

OTHER PUBLICATIONS

Magnetic Recording by S. J. Begun Page 194, 1949 by Murray Hill Books, Inc., N.Y., N.Y.

*Primary Examiner*—Terrell W. Fears
*Attorney, Agent, or Firm*—Waters, Roditi, Schwartz & Nissen

[57] ABSTRACT

Recording and reproducing system suited for adaptation in an apparatus of a delayed time system capable of recording sounds in one direction and reproducing the recorded sounds in both directions with the recorded medium being transferred in the forward or backward direction.

5 Claims, 7 Drawing Figures

RECORDED SIGNAL TRANSMISSION SYSTEM

This invention relates to a recorded signal transmission system, and more particularly it relates to a system of the above type using a recording and reproducing device which allows recording in one direction and reproduction in both directions with the recorded medium being transferred in the forward or backward direction.

An object of the present invention is to provide a recording and reproducing system particularly suited for use in a delayed time system. The system of the invention is capable of recording sounds in one direction and reproducing the recorded sounds in both directions. In the system of the invention, voices or coded signals are once recorded on a recording medium by a recording and reproducing device and then such recording and reproducing devices are connected to both ends of a transmission line. Said device on the recorded signal transmitting side, is rotated in reverse to transport the recording medium to inversely reproduce the recorded signals and, while maintaining the inverted signals, the counterpart recording and reproducing device is rotated in forward direction to effect recording of the reproduced signals after completion of transmission, said counterpart recording and reproducing device is rotated in reverse to reproduce the recorded signals.

The recorded signal transmission system of the present invention is also provided with a device which automatically controls change-over of the transmitting speed to a speed faster than that at which the recording of voices or coded signals is effected, thereby to increase the transmitting efficiency of the system using said transmission line.

The transmission system of the present invention also includes an automatic transmission line changeover device and an automatic answering telephone message delivery device for discriminating between a call from the recording and reproducing device connected to the opposite side of the transmission line and another telephone subscriber's calling signal.

The invention will be more fully understood by reference to the following detailed description thereof, taken in conjunction with the drawings, in which.

Figure 6:
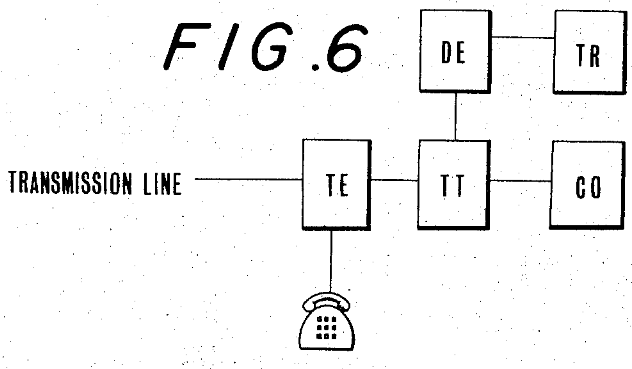

FIGS. 5A and B are illustrations of the protective mechanism in two positions thereof;

FIG. 6 is a block diagram of the transmission system; and

Figure 7:
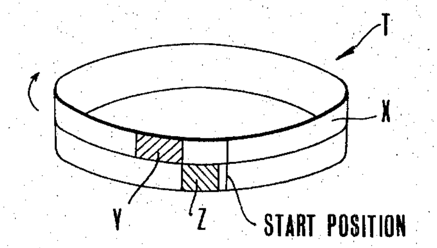

FIG. 7 is a diagrammatic view showing an automatic answering telephone message tape.

Figure 1:
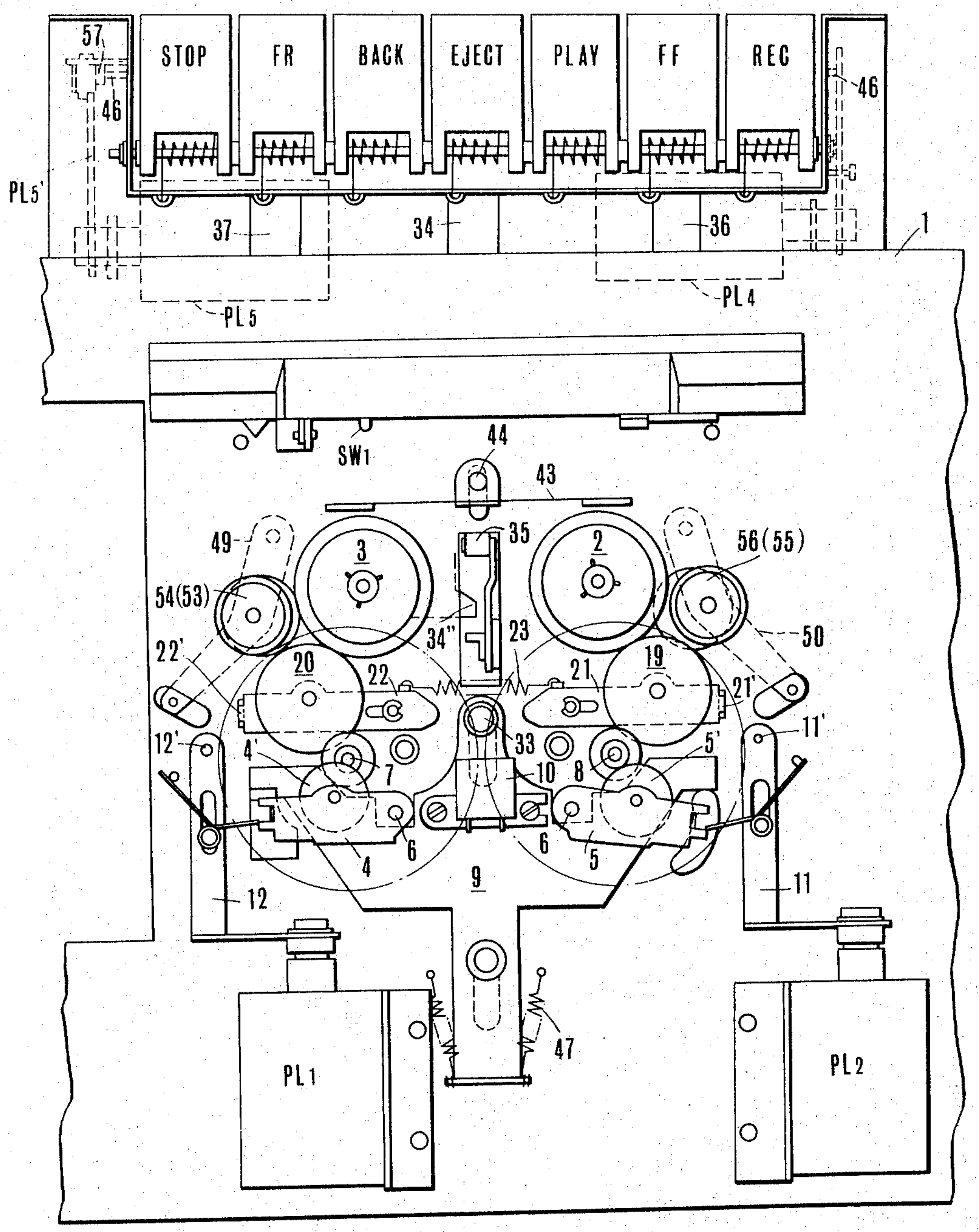
FIG. 1 is a fragmentary plan view of a recording and reproducing device which enables recording in one direction and reproduction in both directions by feeding a record medium in forward or backward direction and which is employed in the recorded signal transmission system of the present invention.
Figure 2:
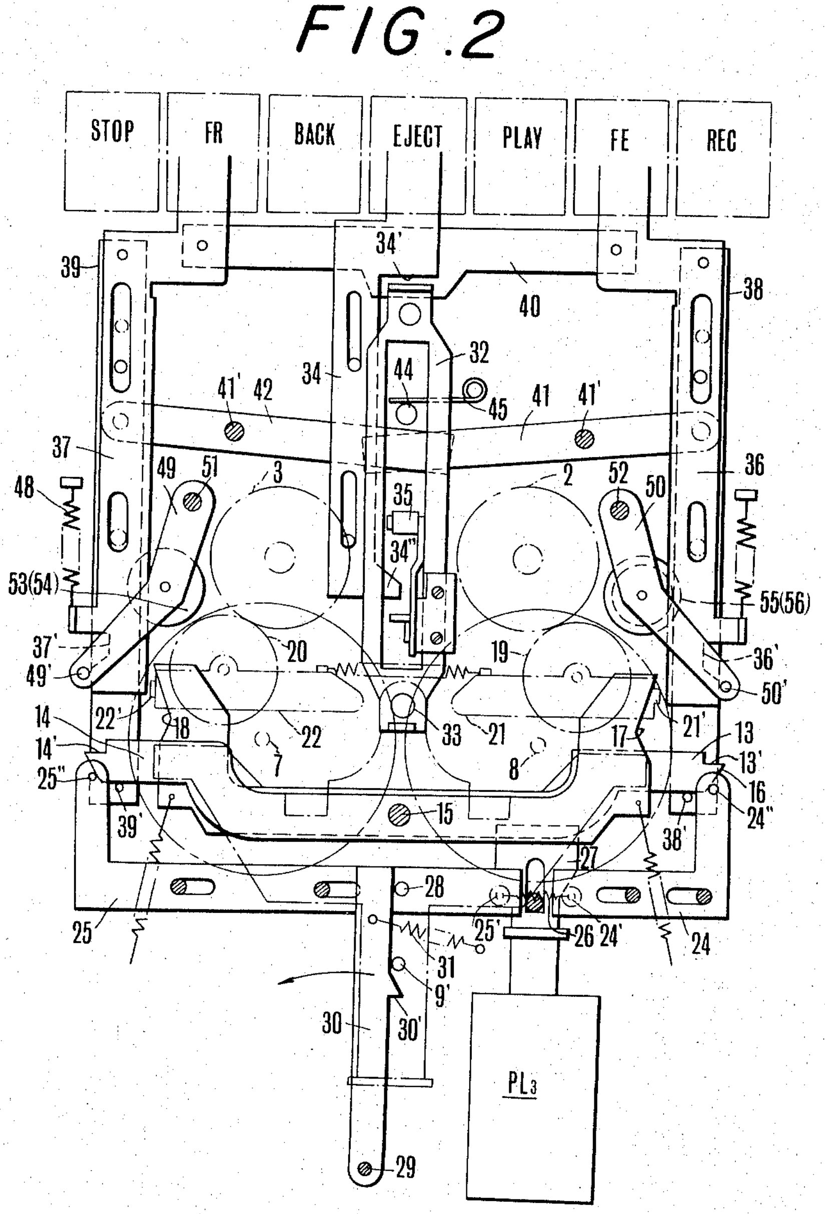
FIG. 2 is a further view thereof.

An example of the basic construction of the recording and reproducing device, as adapted for a magnetic tape recorder using a magnetic recording tape in a cassette as the recording medium, is shown in FIGS. 1 and 2 of the drawings.

In FIGS. 1 and 2, part 1 is a machine casing frame, part 2 is a reel on which the tape scanned in the forward direction is wound up, and part 3 is another reel on which the tape scanned in the backward direction is wound up, both reels 2 and 3 being rotatably journalled on the machine frame.

Part 4 and 5 are pinch roller holders each of which is swingably pivoted at one end by a corresponding supporting shaft (6) and which parts are urged to swing toward the capstan shafts 7 and 8, respectively. Pinch rollers 4' and 5' are pivotally secured to said respective holders 4 and 5. Each of said capstan shafts 7 and 8 has secured thereto a fly wheel pulley 7' or 8' around which a driving belt (not shown) is passed.

Part (9) is a base plate mounted movably for back and forth movement on the machine frame, and a head 10 is fixed on said base plate 9 in known manner. On the upper surface of the machine frame are also disposed a recording action manipulating plunger $PL_1$ and a recording action releasing plunger $PL_2$, which are to be described later. These plungers $PL_1$ and $PL_2$ are connected to the levers 11 and 12, respectively, which are mounted for back and forth movement on the machine frame and which are further provided with pins 11' and 12', respectively.

A pair of operating plates 13 and 14 are pivotally secured to the machine frame by a shaft 15 symmetrically in an overlapping manner as shown. Each of said operating plates has, at its one end, a checking stepped portion 13' or 14' having a tapered face 16 and at its other end, a hollowed checking portion 17 or 18. The faces forming said hollowed portions 17 and 18 are frictionally contacted by raised portions 21' and 22' at the ends of levers 21 and 22 carrying idler wheels 19 and 20, respectively. Said levers 21 and 22 are pulled inwardly toward each other by a spring 23.

Also mounted on the machine frame are the right and left release levers 24 and 25 which are arranged in alignment with each other and urged to move inwardly toward each other by a spring 26. At the spaced ends of said levers are guide pines 24' and 25', respectively, and between said pins is interposed a cam 27 which is tapered along both sides and is secured to an actuation releasing plunger $PL_3$ mounted on the machine frame. At the opposite ends of said release levers 24 and 25 are pins 24'' and 25'', respectively, which are adapted to be engageable with and disengageable from the checking stepped portions 13' and 14' of said operating plates 13 and 14, respectively. Also mounted on said release lever 25 is a push pin 28 which is pressingly abuttable against one side of the sliding end of a lock bar 30 which is pivotally secured at its one end to the base plate by a shaft 29 and has a checking protuberance 30' formed on one side halfway along the length thereof. A pin 9' is mounted on the head base plate 9 in such a manner that it is engageable with and disengageable from said checking protuberance 30'. Said lock bar 30 is pulled toward said pin 9' by a spring 31.

An end of a go-and-return bar 32, mounted movably for back and forth movement on the machine frame, is connected by shaft or pin 33 to the fore end of said base plate 9, the other end of said bar 32 being located closely adjacent to a base portion of a bar 34 which is moved back and forth by operation of an ejection button. A pressing portion 34'' at the fore end of said bar 34 is positioned to be pressingly abuttable against a cassette-ejecting member 35 mounted rotatably on the machine frame 1.

On both sides of the machine frame are movably mounted for back and forth movement a forwardly pivoting quick traverse lever 36 and a reversely pivoting quick traverse lever 37, each having at its end a recession 36' or 37'.

Other levers 38 and 39, each having a pin 38', 39' are superposed on said levers 36 and 37, respectively, to be operable integrally therewith. The base portions of said levers 36 and 37 are pivotally joined to both ends of a connecting bar 40, while the other levers 38 and 39 are pivotally secured to the ends of brake levers 41 and 42, respectively, each of which is pivotally fastened at its middle part to a shaft 41'. As will be also seen, the other ends of said brake levers are intersected with each other, with the intersected portions being positioned so as to be pressingly abuttable against a mounting shaft 44 of a brake 43 movably mounted in the machine frame.

Part 45 is a spring adapted to press said brake shaft toward the reel stands. Part $SW_1$ is a switch arranged to be closed upon insertion of a cassette.

Parts 49 and 50 are quick traverse idler levers rotatably pivoted to the machine frame by shafts 51 and 52, respectively. Said levers have journalled thereto the idler wheels 53 and 54, and 55 and 56, respectively, and also have mounted at the other ends the pins 49' and 50', respectively, which are so positioned as to be engageable and disengageable with the recess 36' and 37' in the levers 36 and 37, respectively.

Having been described from its aspect of structural arrangement, the invention will now be discussed from its operational aspect.

Upon insertion of a cassette, the insertion detecting switch $SW_1$ is closed and thereby closes the motor circuit.

The actuation releasing plunger $PL_3$ is operated upon closure of said circuit, using the tapered cam 27 provided on said plunger rod to press the pins 24' and 25' so as to push outwardly and separate the release levers 24 and 25 from each other. This causes the pin 28 on the lever 24 to press the lock bar 30 to make the latter turn about the shaft 29 in the direction of the arrow against the elastic force of the spring 31. This turning movement of the lock bar forces the pin 9' on the head base plate 9 to move out of engagement with the checking protuberance 30', and as the base plate advances under the force of the spring 47, the head on said base plate comes into contact with a side of the tape placed in the cassette which has been fitted in position in the device.

When an electric current is applied to the plunger $PL_1$ to operate it for effecting recording, the lever 12 connected to said plunger is retracted to let the operating plate 14 engage with the pin 12' of said lever and turn counterclockwise about the shaft 15 until the checking portion 14' of said plate 14 is engaged with the pin 25'' on the release lever 25 to keep said operating plate 14 in an inclined condition.

This inclination of the working plate 14 presses the pin 39' engaged with said plate to retract the lever 39 to allow one of said brake levers 42 to turn about the shaft 41' so that the moving end of said lever 42 pushes up the mounting shaft 44 on the brake holding member to free the brake 43 from pressing against the reel stands. Above-said inclining motion of the operating plate 14 also causes the raised up portion 21' of the idler lever 21 to fit into the checking portion 17 of said operating plate, allowing said idler lever 21 to move inwardly under the elastic action of the spring 23, thus bringing the idler wheel 19 into a position where it is pressed between the capstan shaft 8 and the reel stand 2 so that rotation of said capstan shaft 8, which has received rotation from the motor, is transmitted through the idler wheel 19 to the reel stand 2 to cause the latter to rotate accordingly.

The above-said tilting movement of the operating plate 14 also causes counterclockwise rotation of the pinch roller 5' which has so far been spaced apart from the capstan shaft 8, thereby letting the tape engage against the capstan shaft 8 so that the tape is scanned in the forward direction (toward the take-up side).

Thereafter, when an electric current is applied to the plunger $PL_3$ by a control signal to actuate said plunger, the operating plate 14 is freed from its inclined condition in which said plate has been locked by the release levers 24, 25 and pin 25'' and, consequently, the idler lever 21, which has been fitted in the checking portion 17, is allowed to return to its original position aginst the force of the spring 23. This also allows the pinch roller to separate from the capstan shaft and the idler wheel is freed from confinement between the capstan shaft and the reel stand, thus interrupting the rotation.

Concerning the reproducing operation of the present device, it should be noted that the present device is provided with a specific mechanism for reproducing the recorded sounds by feeding the tape backwardly, in addition to a conventional type reproducing mechanism in which the tape is fed in the forward direction. Since the forward-feeding operation is similar to the recording operation, there will be no need to explain it here, and therefore the following discussion is devoted to the reproducing operation where the tape is fed backwardly.

When the plunger $PL_2$ is actuated by a reproduction signal, the lever 11 is pulled down to cause the recording and reproducing operating plate 13 to turn clockwise about the shaft 15 until the checking portion 13' of said plate comes to keep said operating plate 13 in an inclined condition.

Consequently, the raised up portion 22' of the idler lever 22 is dropped into the hollowed checking portion 18 of the operating plate 13, urging said lever to move inwardly to bring the idler wheel 20 of said lever into a position where it is between the capstan shaft 7 and the reel stand 3 so as to convey rotation of the capstan shaft 7 to the reel stand 3 and the pinch roller 4' is contacted with the capstan shaft 7 to feed the tape backwardly. Thus, the mechanism is changed over to a backward feed reproducing condition.

When it is desired to quickly deliver the tape into said recording or reproducing condition either in the forward or in the backward direction, this can be easily accomplished by operating a push button FF for quick delivery or a push button FR for backward quick delivery.

Next is discussed the quick delivery mechanism.

When the lever 36 is pushed down against the elastic force of the spring 48 by operating the push button FF, the pin 50' on the lever 50 drops into the recession 36' in the lever 36 to allow said lever 50 to move about the shaft 52, whereby the idler wheel 55 for quick delivery is brought into contact with the reel stand 2 while the idler wheel 56 on the same shaft is contacted with the fly wheel 8', thereby allowing quick delivery of the tape in the forward direction.

During this operation, movement of said lever 36 causes the brake lever 41 to turn about the shaft 41' so that its moving free end pushes up the mounting shaft 44 on the brake holding member so as to separate the brake 43 from the reel stands 2 and 3.

When the push button FR for quick backward delivery is pushed, the lever 37 on the opposite side is operated to delivery the tape in the backward direction.

The present device, as discussed above, not only has a function to reproduce the recorded sounds by winding back the recorded tape in the forward direction as in the known magnetic tape recorders, but also additional function to perform such reproduction by winding the tape in the backward direction. The head is always positioned in contact with the tape.

For removing the cassette, the ejection button is pushed to retract the head base plate and turn the cassette ejecting member 35 to thereby eject or spring out the cassette.

Figure 3:
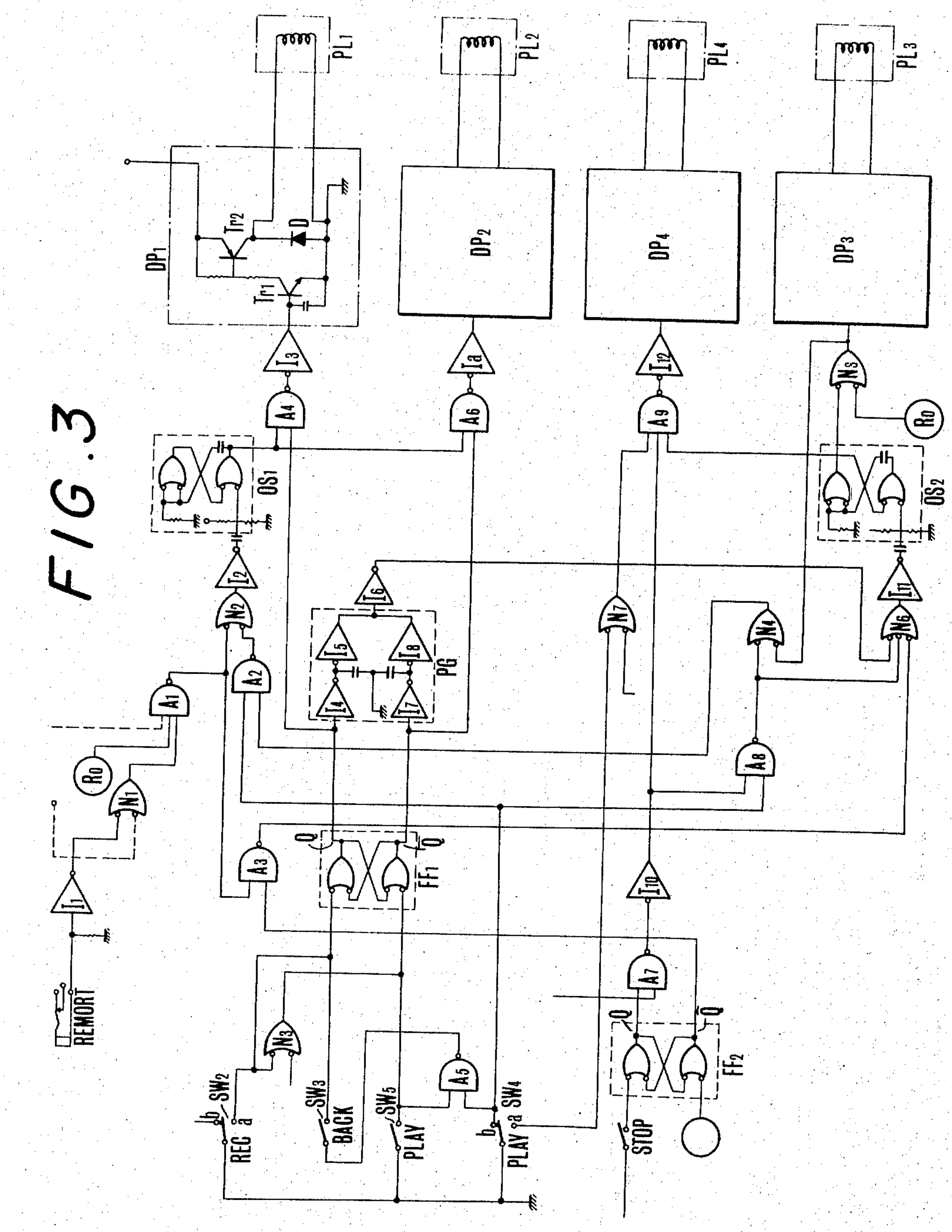
FIG. 3 is a schematic diagram of electric circuits for operating the above-said device.

For automatically controlling said magnetic tape recorder, the switch $SW_2$ (FIG. 3) is opened/closed by a recording button REC, the switches $SW_3$ and $SW_4$ by a backward playback button PLAY, the switch $SW_5$ by a forward playback button BACK, and the switch $SW_6$ by a stop button STOP, respectively, as shown in FIGS. 1 to 3, so as to control electric circuits the recording action manipulating plunger $PL_1$, backward playback actuating plunger $PL_2$, action releasing plunger $PL_3$, pushed-down recording and/or playback push button lock releasing plunger $PL_4$, and protection plunger $PL_5$ for preventing inadvertent push button release which may be caused by misoperation during signal recording.

The above said switch $SW_5$ is arranged to be opened and/or closed when the backward playback button PLAY is over-stroked, that is, the switch $SW_4$ is opened and/or closed when said button is in a pushed-down and locked condition, and the switch $SW_5$ is opened and/or closed as said button is further pushed down.

In the circuitry of FIG. 3, $I_1 - I_{12}$ represent the NOT circuits (inverter circuits), $A_1 - A_9$ the NAND circuits (NOT-AND circuits), $N_1 - N_6$ the NOR circuits (NOT-OR circuits), $OS_1 - OS_2$ one-shot multivibrators, $FF_1 - FF_2$ the flip-flop circuits, $DP_1 - DP_4$ the plunger driving circuits for the corresponding plungers $PL_1 - PL_4$, and PG a pulse generating circuit which generates one pulse upon every rising and falling of an input signal.

Figure 5:
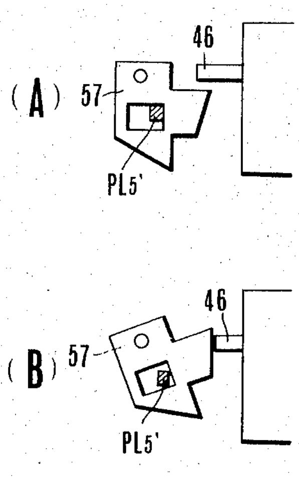

Although not shown, the circuit of the protection plunger $PL_5$ is energized when a recording action termination signal enters its driving circuit DP as with the other plungers, and its mechanical arrangement consists of a check rod 46, a block 57 and a protective lever PL5' as shown in FIGS. 1 and 5. In case of operating said plunger by an electric circuit, such mechanical means are not provided in the stop button STOP and, instead, the check rod 46 of the push button is pushed by the lock releasing plunger $PL_4$ to thereby effect the desired release.

The case in which the recording and reproducing device is utilized as a part of the transmission system:

The embodiment where the above-described recording and reproducing device is operated by an electric circuit will be described comprehensively by connecting the device to a transmission line.

For connection with the transmission line, a switching device TE having the below-enumerated means is connected in front of the recording and reproducing device TT as shown in the block diagram of FIG. 6.

1. Switching means for the outer line telephone and the above-said recording and reproducing device;
2. Exchange line calling device and ringer detecting means;
3. Automatic switching means for (1) and (2);
4. Automatic answering telephone message delivery means;
5. Data transmission control signal delivery means;
6. Control signal discriminator for (5).

In the rear of said recording and reproducing device are connected a coder CO and a decoder DE each having the below-enumerated means:

Coder CO

1. Date-coding frequency generator;
2. Signal converter;
3. Keyboard;
4. Keying display.

Decoder (DE)

1. Signal decoding means;
2. Signal type-out converting means;
3. Block number and wrong word number setting means.

A typewriter TR or a printer is also connected to the decoder DE.

In the operation of the transmission system including the above-said recording and reproducing device TT, first a data signal to be transmitted is recorded in the following process.

Recording Operation

The coder CO is connected to the recording and reproducing device TT and the button REC of TT is pushed down (and locked), whereby the electric source is turned ON to start operation of the tape driving motor of the device TT. At the same time, the action release plunger $PL_3$ is also actuated and its rising signal causes operation of the recording action manipulating plunger $PL_1$, and this turns ON the pinch roller 5' for foward rotation to allow the tape run in the forward direction. One second after initiation of the tape movement, the control signal (fo) fed into the recording and reproducing device is recorded for the duration of two seconds, and upon the lapse of another two seconds, the action release plunger $PL_3$ is again actuated to temporarily stop the tape movement.

Then the keyboard of the coder CO is touched to key the data of one block (eight characters) and then the tape starter button TS of the coder CO is pushed to acutate said plunger $PL_1$ for forward rotation to again allow movement of the tape. After a 0.5-second-duration, the data of one block keyed into said coder CO undergo frequency conversion and are recorded on the tape for a duration of 0.8 second.

Upon completion of this recording of one block date, the action release plunger $PL_3$ is actuated to stop tape from travelling.

Then, again the keying of the data of the next block os performed in the coder CO and the button TS is pushed, whereby the forward rotation plunger $PL_1$ is actuated to commence travelling of the tape. After an 0.5 second duration, the data of said next block are recorded for a duration of 0.8 second.

In the same manner, the "keying" and "recording" are repeated for each of the ensuing blocks successively until the recording of all the blocks is completed.

Upon completion of this recording operation, the STOP button of the recording and reproducing device TT is pushed, whereby the plunger $PL_1$ for forward rotation is first actuated to cause the starting of tape travel. One second after said starting of tape travel, the fo signal is recorded for a duration of 2 seconds. After an additional 3-second idle tape delivery, the action release plunger $PL_3$ is actuated to turn the pinch roller OFF to stop tape travelling, and at the same time the push button lock releasing plunger $PL_4$ is actuated to return the REC button to the OFF position. Consequently, the electric source of the recording and reproducing device and the coder CO is turned OFF to stop the tape driving motor to deenergize all the circuits of said device TT and coder CO.

For recording sounds in the course of said data code recording or after completion of such code recording, a mike jack is inserted into a socket in the recording and reproducing device and an ON-OFF switch attached to the mike is operated to effect forward delivery of the tape through remote control, thus allowing desired recording for any desired period of time. In this case, the above-said setting of recording practice may be maintained as it is without giving rise to any impediment to the operation. In this manner, there is prepared a tape on which the data to be transmitted are recorded.

For transmitting the contents of informations on the recorded tape to the other party at a remote point through a transmission line or, in some cases, an interphone line, by loading said recorded tape in the recording and reproducing device or under the condition where said recording has just been completed, the recording and reproducing device at the place of the other party is connected to the transmission line by the "exchange line calling operation" to be described later, and the recording and reproducing device TT is rotated backwardly to deliver the recorded tape in the backward direction so as to reproduce the recorded signals in reverse, while the recording and reproducing device at the other party is rotated forwardly to record the backward signals. Upon completion of the transmission, said device at the other party is rotated backwardly to reproduce the recorded signals in the form of forward signals, which are then typed out by the typewriter TR through the decoder DE.

The above-said recording and reproducing method employed in the transmission system can dispense with the recorded tape wind-back operation, thus allowing reduction of the transmission time.

Additional shortening of the transmission time can be accomplished by operating the recording and reproducing devices connected to both ends of the transmission line such taht reproduction and recording is conducted at a speed much faster than that employed for preparation of the recorded tape as the transmission line characteristics permit, for instance at a doubly as high speed 2S, while performing reproduction of the re-recorded tape on the side of the other party at the standard speed S at which peparation of the recorded tape was practiced.

Playback Operation

The above-said reproducing operation will now be explained in a step-by-step manner. When the PLAY button of the recording and reproducing device TT is pushed down (and locked), the electric power source is turned ON to start operation of the tape driving motor and also actuate the action release plunger $PL_3$, and the rising signal of the latter initiates actuation of the backward delivery playback operating plunger $PL_2$, whereby the pinch roller 4' for backward rotation is turned ON through the idler 20, allowing the tape to travel in the direction opposite to that in which the tape was travelling during the recording operation. Thus and thus playback is effected and the recorded signals are transmitted to the recording and reproducing device of the other party.

When it is desired to convert this condition to playback operation in a forward delivery pattern by reversing the tape travelling direction as in the known magnetic tape recorders, the BACK button of the recording and reproducing device TT is pushed (not locked) whereby the action release plunger $PL_3$ is actuated to turn OFF said pinch roller 4', thus actuating the recording operating plunger $PL_1$. This turns ON the pinch roller 5' for forward rotation to change the tape travelling direction from the backward to the forward direction, and thus reproduction is conducted in the same direction as that of recording.

When it is desired to move the tape back to a certain reproduced part thereof so as to make re-production of such part, the PLAY button is additionally pushed down through the distance of its over-stroke portion whereby the action release plunger $PL_3$ is first actuated to temporarily stop travelling of the tape. Then the backward delivery playback operating plunger $PL_2$ is energized to let the tape move in the backward direction until it reaches the desired part. Then, the BACK button is again pushed to effect reproduction of said part in the forward direction.

Thus, by alternately operating the BACK button and the overstroke of the PLAY button, it is possible to optionally switch the reproducing operations of the forward and backward directions from and to each other.

For stopping this reproducing operation, the STOP button of the recording and reproducing device TT is pushed down whereby the action release plunger $PL_3$ is actuated to turn OFF said both pinch rollers 4', 5 to stop tape movement, and at the same time the push button lock releasing plunger $PL_4$ is actuated to let the PLAY button return to its OFF position. Consequently, the electric power source is turned OFF to stop the motor, thereby terminating the entire circuit activities of the recording and reproducing device TT.

During the "PLAY" operation, if desired, "quick delivery" or "quick return" can be purely mechanically performed by pushing the button FF or FR of the recording and reproducing device TT. Such performance has nothing to do with the circuit activities themselves.

Figure 4:
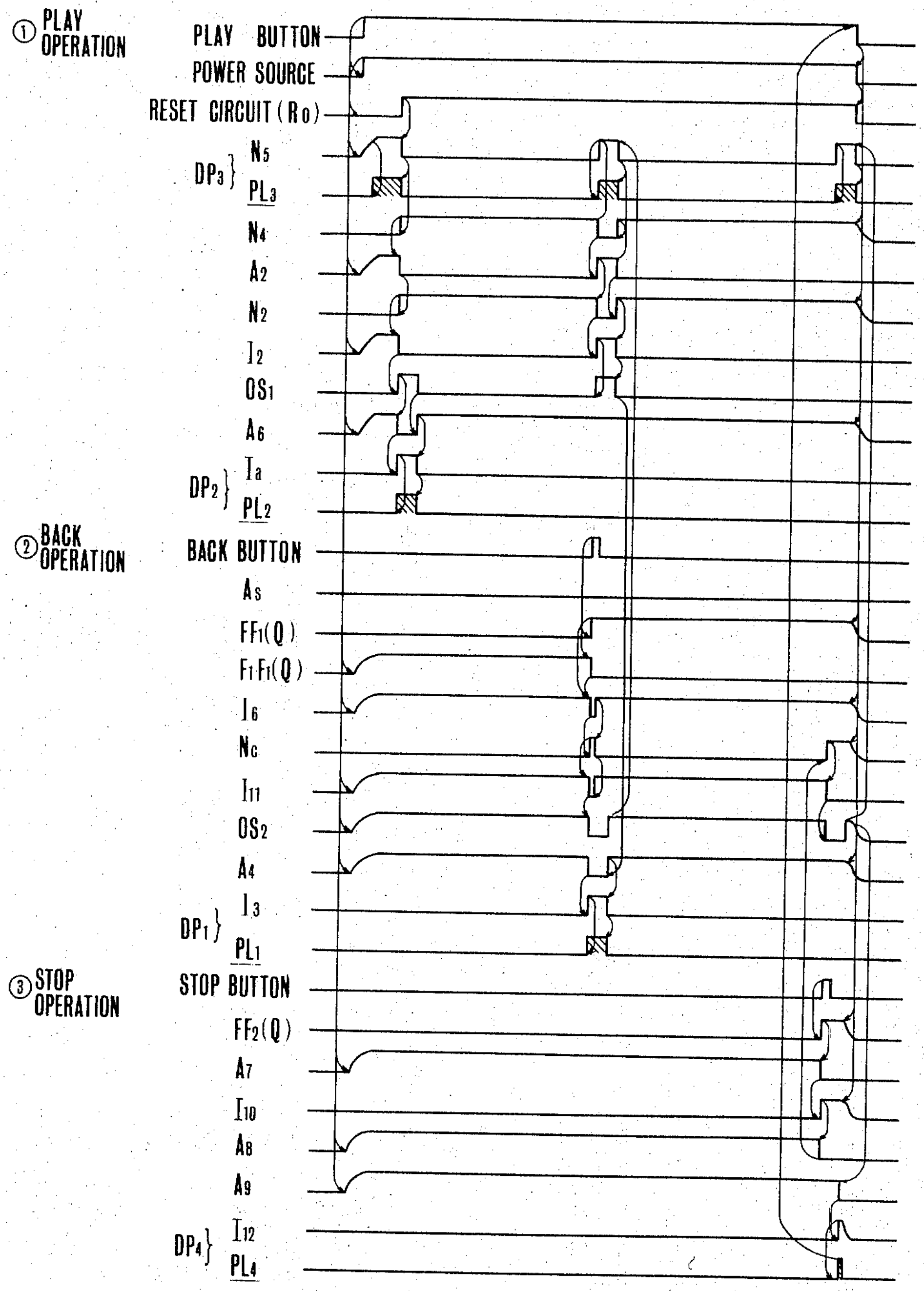
FIG. 4 is a diagram showing circuit activities when a push button is operated.

The above-said operations of PLAY BACK and overstroke of PLAY STOP are accomplished by the respective circuits shown in the drawings, and the order of actuation of the respective circuits in said operations is such as shown in the circuit diagram of FIG. 3 and the timer chart of FIG. 4.

Exchange Line Calling Operation

For reproducing the recorded sounds for transmission by operating said recording and reproducing device TT and recording the reproduced sounds in the recording and reproducing device of the other party, it needs to know whether the exchange at the other end of the telephone line is in a situation where it can be connected to said recording and reproducing device. It is also required of the exchange to determine whether the caller is a party from whom a general subscriber can receive specific transmission.

For convenience of explanation, the discussion is advanced by assuming that the following conditions were established:

Transmitting side A: Switching device TE and recording and reproducing device TT are switched to the transmission circuit.

Receiving side B: Similarly switched to the transmission circuit and the automatic answering telephone is operating.

1. First, the transmitter side A calls the receiving exchange B by operating a dial or a push button provided on the switching device TE. Under this condition, the recording and reproducing devices TT on both transmitting and receiving sides are previously set at a speed faster than the reference speed S, for example at a speed 2S.

2. Upon being called, the ringer of the receiving exchange B is sounded. As the ringer is detected, an electric current is applied to the electric power source of the recording and reproducing device TT and the switching device TE of the exchange B, whereby the messages are delivered from the automatic answering message delivery means installed in said device TE and also a data transmission control signal fo is delivered.

3. As soon as the transmitting side A receives said automatic answering message and control signal fo and confirms the voice sounds, said control signal fo is discriminated and an electric current is applied to the electric source of the switching device TE and recording and reproducing device TT of the transmitting side A, and at the same time control signal fo is transmitted from the transmitting side A so that the tape is delivered under a condition where the recording and reproducing device TT of the A side is in a backward delivery reproducing operation while that of the B side is in a recording operation through a flip-flop circuit FF in the electric circuit of FIG. 3. Thus, the contents of the tape on which said informations were recorded are transmitted and recorded at a speed of, for example, 2S.

In case the reproducing speed of the recorded tape is 2S, that is, double the reference speed, the recorded contents mentioned in the aforesaid (recording) operation, for example, the control signal (fo), is transmitted as doubled fo (hereinafter referred to as 2 fo).

4. The flip-flop circuit FF is activated as described above by the first control signal 2 fo with reproduction of said recorded tape, and the tape is delivered with the A side being in a backward delivery reproduction pattern and the B side in a recording pattern. The flip-flop circuit FF is also activated by the last control signal 2fo to apply an electric current to the deenergizing plunger $PL_3$ to thereby stop the tape delivering operations at both sides A and B.

5. Upon this stoppage of the tape delivering operation, the control signal fo is issued from the control signal issuing means to open the circuits of the electric sources of both sides to thereby complete one cycle of transmission operation, and the information recorded in the B side typed out in the same manner as described in the preceding (recording) operation.

6. The automatic answering message delivery means reproduces and delivers the message tape T shown in FIG. 7.

Said message tape T comprises an upper and a lower track, the upper track comprising a message-contained portion X and a caller's dictation starting signal portion Y where the message, upon completion thereof, is reproduced and the plungers $PL_1$ and/or $PL_2$ of said recording and reproducing device TT are actuated, while the lower track includes a tape delivery stopping signal portion Z which is positioned behind said caller's dictation starting signal portion as viewed in the direction of tape advancement.

Recording of the caller's dictation is made in the recording and reproducing device TT. In case transmission of the control signal fo from the A side described in 3 above is received by the B side, said transmission system is activated, but in case such control signal fo fails to be received by the B side within a certain limited period of time, it is judged that the caller is not from A but from other subscriber, and the recording speed of the recording and reproducing device of the B side is automatically changed to the reference speed S.

Said message tape (T) is an endless tape and moves circularly, and when the tape delivery stopping signal has been counted three times, that is to say, when the tape has rotated thrice, the automatic answering message delivery means and the recording and reproducing device TT are stopped.

In case the caller is identified by the control signal fo during transmission of the answering message, the message is not forwarded to the telephone line and also the tape delivering speed of the recording and reproducing device TT is kept at 2S to stay ready for recording the transmitted signals.

If need be, the transmission line and the switching device TE may be coupled by a voice coupler which vocally connects the telephone transmitter and receiver.

While particular forms of the invention have been shown and described, it is to be understood that the invention is capable of many modifications. Changes, therefore, in construction and arrangement may be made without departing from the scope of the invention as given by the appended claims.

What is claimed is:

1. A recorded signal transmission system comprising at least first and second recording and reproducing means each including a recording medium and in which coded signals are recorded on the recording medium of one of said recording and reproducing means, a transmission line, said first and second recording and reproducing means being connected to said transmission line to form transmitting and receiving sides, the recording medium of said means on the transmitting side being first first rotated in the backward direction and then being transported to backwardly reproduce the thereby recorded signals, the recording medium of the means at the receiving side being rotated in forward direction to record the reversed signals and, upon completion of transmission, said medium of the means on the receiving side being rotated in backward direction thereby to reproduce the recorded signals without a preliminary rewinding of the latter said recording medium, control means to control the forward and backward movement of the recording media, the recording media being characterized by a normal speed of recording, means in said recording and reproducing means on the transmitting side whereby the medium in the latter said means is delivered backwardly from the point of termination of recording toward the recording starting point at a speed at least two times faster than the normal recording speed to make a reproduction thereof on the medium of the recording speed to make a reproduction thereof on the medium of the recording and reproducing device of the receiving side which includes means to rotate the latter said medium in reverse at the same speed as that of the medium at the transmitting side to record reproduced signals and to reproduce the received recorded signals from said recording starting point with no need of rewinding the recording medium at the receiving side, a control system comprising means for generating a control signal for recording on the recording media before and after recording of the coded signals, and means by which transportation of said media is stopped by the control signal of the transmitter side by being recorded on the recording medium on the transmitting side; the recording and reproducing means at the transmitting side including a telephone, a telephone exchange means coupling said telephone to said transmission line, a coder and recording and reproducing device connected serially to said exchange means, a typewriter and a decoder coupling said recording and reproducing device to said typewriter; said recording and reproducing device further comprising recording, reverse, stop and forward and first playback switches, a first flip flop coupled to said record, reverse and forward playback switches, a pulse generator connected to said flip flop, a second flip flop connected to said stop switch, a plurality of plunger driver circuits, an electro-mechanical tape driving system including plungers operated by said driver circuits, a NOR, NAND and NOT circuit connected in series between said reverse playback switch and one of said driver circuits, a NAND, NOT, NAND and NOT circuit connected in series between said second flip flop and a second of said driver circuits, and two NANDS, a NOR, a NOT, a one-shot multivibrator and a NOR circuit connected in series between said second flip flop and a third of said driver circuits.

2. A recorded signal transmission system as claimed in claim 1 wherein said driver circuits includes collector-to-base connected transistors, a diode connecting the transistors in base-to-collector relation, and a plunger operating coil driven by said transistors.

3. A recorded signal transmission system as claimed in claim 2 wherein said recording and reproducing device comprises first and second reels respectively constituting take-up reels for tape scanning in forward and reverse directions, capstan shafts respectively associated with said reels, idlers between said shafts and reels, pinch rollers operatively associated with said idlers, and further idlers selectively insertable between the first said idlers and said reels.

4. A recorded signal transmission system as claimed in claim 3 comprising a linkage system coupled to said further idlers, and a plunger operated by one of said coils and operating said linkage system.

5. A recorded signal transmission system as claimed in claim 4 comprising a brake for braking said reels and a plunger operating said brake and operated by one of said coils.

* * * * *